United States Patent [19]

Renner

[11] Patent Number: 4,835,767

[45] Date of Patent: May 30, 1989

[54] ADDITIVE PCM SPEAKER CIRCUIT FOR A TIME SHARED CONFERENCE ARRANGEMENT

[75] Inventor: Robert E. Renner, Phoenix, Ariz.

[73] Assignee: GTE Communication Systems Corporation, Phoenix, Ariz.

[21] Appl. No.: 116,180

[22] Filed: Nov. 2, 1987

[51] Int. Cl.[4] .......................................... H04Q 11/04
[52] U.S. Cl. .................................................... 370/62
[58] Field of Search .................... 370/62, 63; 379/202; 381/119

[56] References Cited

U.S. PATENT DOCUMENTS

| | | | |
|---|---|---|---|
| 4,416,007 | 11/1983 | Huizinga et al. | 370/62 |
| 4,466,092 | 8/1984 | Renner | 370/62 |
| 4,466,093 | 8/1984 | Renner | 370/62 |
| 4,466,094 | 8/1984 | Renner | 370/62 |
| 4,509,166 | 4/1985 | Simon | 370/62 |
| 4,648,089 | 3/1987 | Hsing | 370/62 |

Primary Examiner—Douglas W. Olms

Attorney, Agent, or Firm—Anthony Miologos; Frank J. Bogacz

[57] ABSTRACT

A time shared multiport conference arrangement includes an additive PCM speaker circuit. The additive PCM speaker circuit eliminates the need for loudest speaker detection and the last speaker memory of conventional conferencing arrangements. The additive PCM speaker circuitry operates in an on-line, real time environment to allow rapid summing of speakers' PCM voice samples. Since the PCM voice samples are logarithmic in nature, they are not directly combinable. The additive PCM speaker circuitry provides a storage medium which is preprogrammed with resultant values. These resultant values each correspond to a PCM addition of the values of two input speaker's PCM voice samples. The additive PCM speaker circuit simplifies the complex processing logic usually associated with loudest speaker detection systems and thereby improves the real time operation of the conferencing arrangement.

12 Claims, 5 Drawing Sheets

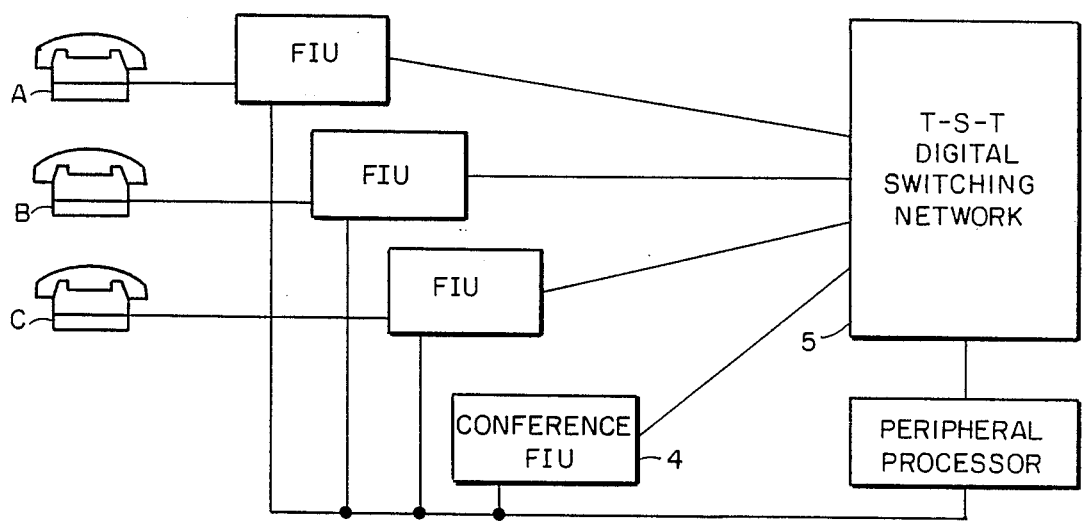
FIG. IA

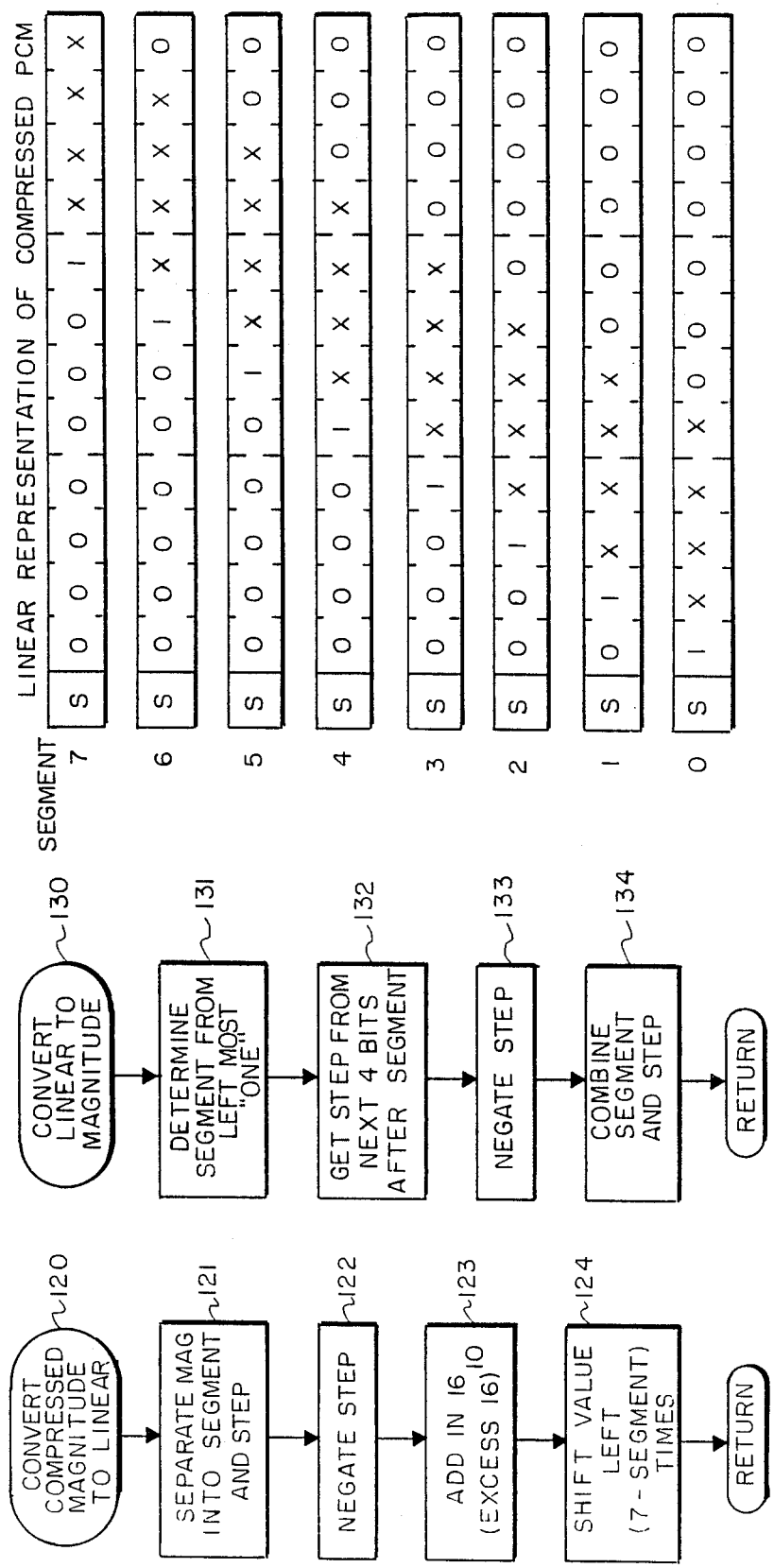

FIG. 7

ADDITIVE PCM SPEAKER CIRCUIT FOR A TIME SHARED CONFERENCE ARRANGEMENT

CROSS-REFERENCE TO RELATED APPLICATIONS

This Application is related to co-pending U.S. patent application Ser. No. 116,181, having the same inventive entity and being assigned to the same assignee as the present Application. This Application is also related to co-pending U.S. Pat. applications Ser. Nos. 116,182 and 116,183, which have the same assignee as the present Application.

BACKGROUND OF THE INVENTION

The present invention generally pertains to a conference calling arrangement for a digital switching network and more particularly to improvements for speaker selection and broadcasting for multi-port conference circuitry.

U.S. Pat. No. 4,466,093 teaches a time shared conference arrangement. U.S. Pat. Nos. 4,466,092 and 4,466,094 also teach similar techniques. The assignee of the present application is the successor in all rights, title and interest to the assignee of the U.S. Pat. No. 4,466,093.

This patent teaches the broadcasting of the "loudest speaker" to the other conferees. A series of on-line comparisons is made between the PCM magnitude levels of up to three conferees. Such on-line comparisons require an amount of switching system real time. Next, this patent teaches the comparison of the loudest detected speaker to a threshold level. If the PCM magnitude of the speakers values exceeds this threshold, then this loudest speaker's PCM sample is broadcast to the other conferees during the appropriate time slots. If the PCM magnitude of the loudest conferee did not exceed the threshold, then the identity of the loudest conferee stored during the previous sampling time period was selected and the corresponding PCM sample broadcast to the other conferees during the appropriate time slots.

This technique provided for rapid switching between the speakers introducing noise. As a result, the overall audible quality broadcast to the conferees was substantially degraded when two or more parties spoke simultaneously.

When multiple sound sources are present, the human ear hears a combination of all the various sources. Some of the sources are louder in amplitude than others. The PCM samples, which represent speech sound, of modern digital networks are not directly combinable. Therefore, the human ear listening via a digital switching system does not hear a true combination of each conferee's speech.

PCM data samples are nonlinear logarithmic representations of human speech. Since these PCM samples are nonlinear, they are difficult to combine.

It is an object of the present invention to provide a PCM speaker control circuit for a time shared conference arrangement of a digital switching system which provides for low noise output and true representation of each conferee's speech.

SUMMARY OF THE INVENTION

In accomplishing the object of the present invention a novel additive PCM speaker circuit for a time shared conference arrangement is provided.

A Time-Space-Time switching system includes a plurality of switching system subscribers. Three subscribers of this plurality: a first, a second and a third may be connected in a time shared conference arrangement. The switching system has a time-space-time digital switching network which is connected to each of the subscribers. The switching network operates to connect the three subscribers in a conference call by transferring PCM voice data samples of the subscribers in three consecutive time slots.

The conference arrangement includes a timing generator, which is connected to the switching network and operates to generate a plurality of periodic pulses. A first buffer is connected to the timing generator and to the switching network. This buffer operates to sequentially store the voice data of the three consecutive switching network time slots. This voice data are the PCM samples of the three subscribers in the conference call.

During a successive time slot, a second buffer, which is connected to the timing generator and to the first buffer, simultaneously stores all three of the voice data samples. At the same time, the first buffer stores a voice data sample for one particular subscriber of a second conference call.

First gating logic is connected to the second buffer and to the timing generator and is operated to transmit two voice data samples of the stored ones, during each time slot. A combining arrangement is connected between the first gating logic and an output multiplexer. The combining arrangement has as inputs the values of the two voice data samples of the first gating logic. The combining arrangement produces as an output, a resultant voice data sample. The resultant voice data sample is the additive combination of the values of the two voice data samples of the first gating logic.

BRIEF DESCRIPTION OF THE DRAWINGS

FIG. 1A is a block diagram of a conference call arrangement in a time-space-time switching system.

FIGS. 2 through 5 are flow chart diagrams of the method for generating the data contents for the programmable read only memory of the present invention.

FIG. 6 is a bit layout diagram of eight segment linear representations of compressed PCM samples.

FIG. 7 is a partial list of the values of the programmable read only memory of the present invention.

DESCRIPTION OF THE PREFERRED EMBODIMENT

This invention comprises an improvement to U.S. Pat. No. 4,466,093. This application is assigned to the successor of all rights, title and interest of U.S. Pat. No. 4,466,093. U.S. Pat. 4,466,093 is hereby incorporated by reference.

Figure 1:
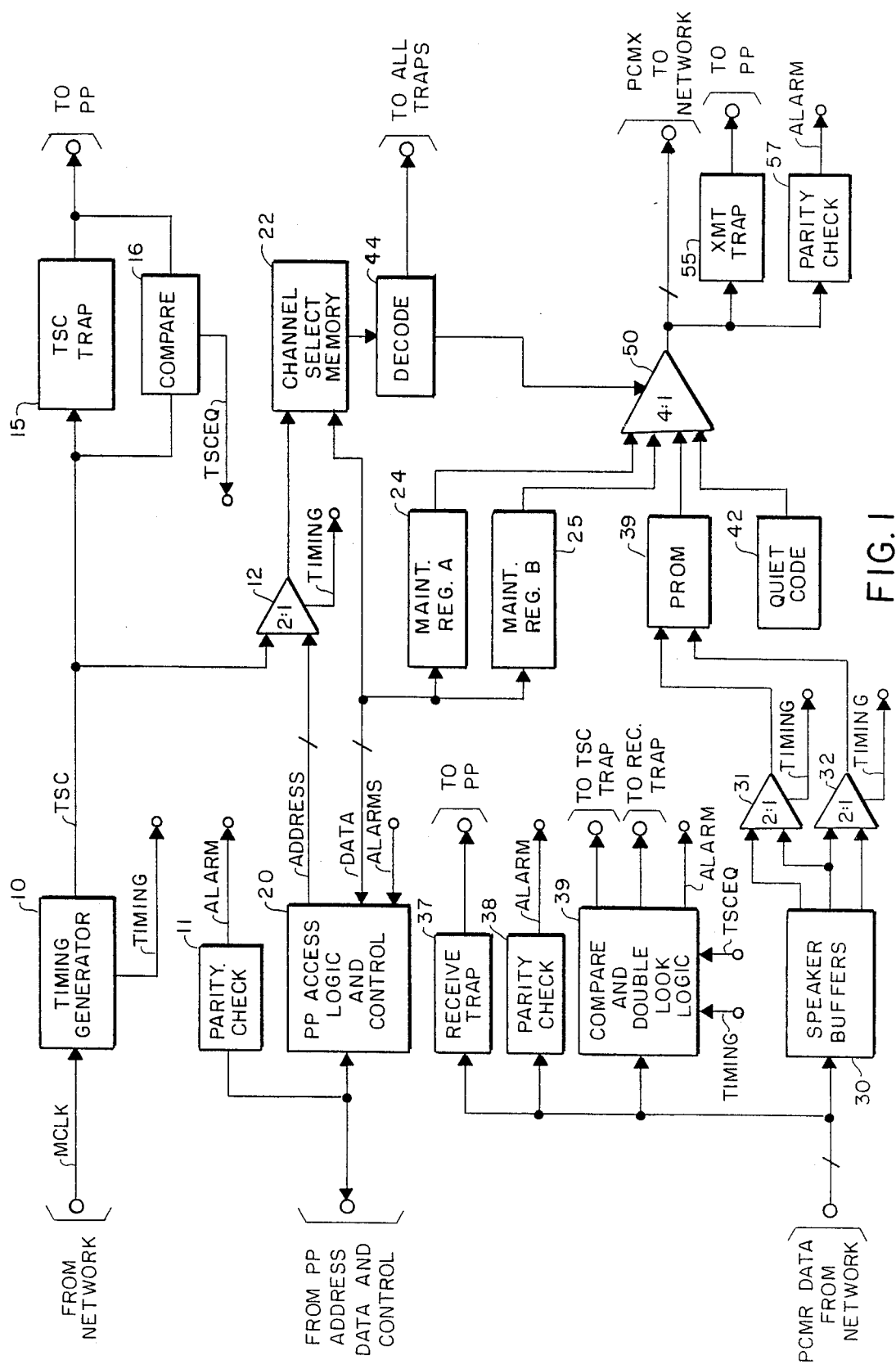
FIG. 1 is a block diagram of the additive PCM circuitry embodying the improvements of the present invention.
Figure 3:
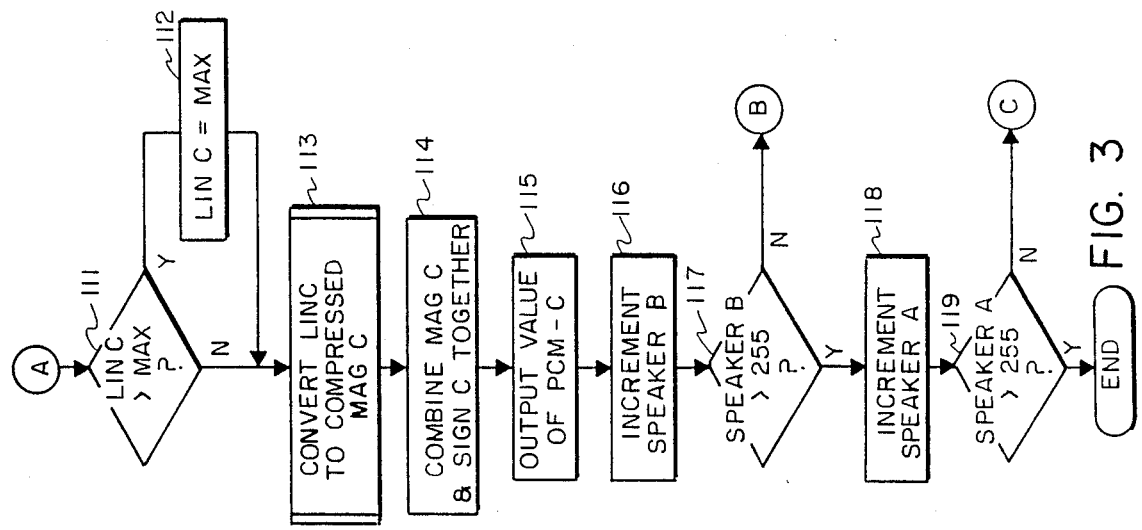

With reference to FIG. 1A of the present invention, a time-space-time switching system including a plurality of switching system subscribers is illustrated. Three subscribers of this plurality: a first subscriber A, a second subscriber B and a third subscriber C may be connected to a time shared conference arrangement via conference FIU 4. The switching system has a time-space-time digital switching network 5 which is connected to each of the subscribers A, B and C. The switching network 5 operates to connect the three subscribers in a conference call by transferring PCM voice samples of the subscribers in three consecutive time slots. A better understanding of the time-space-time switching system may be had by reference to FIG. 1 of U.S. Pat. No. 4,466,093.

Figure 2:
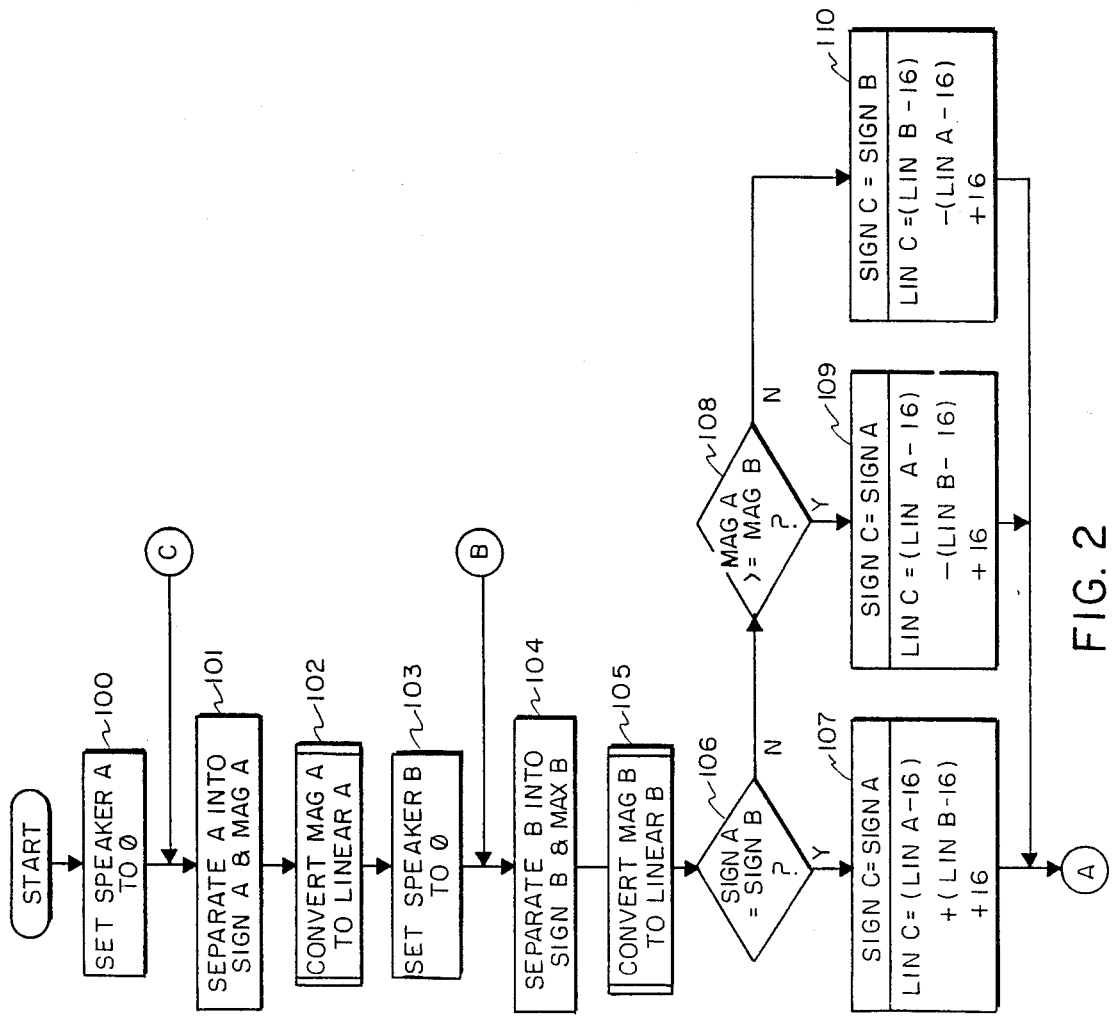

In FIG. 2 of U.S. Pat. No. 4,466,093, last speaker memory 35, speaker select and threshold logic 40 and multiplexer 34 are depicted. The logic details of these functional blocks are shown in FIG. 5 of that Patent.

The present invention includes the replacement of last speaker memory 35, speaker select and threshold logic 40 and multiplexer 34 as shown in FIG. 2 of U.S. Pat. No. 4,466,093 with a programmable read only memory. As a result, the logic of FIG. 5 shown in that Patent is completely replaced by one integrated circuit programmable read only memory (PROM) of 64K × 8 bits.

Referring to FIG. 1 of the present application, the PCM received data from the switching network is transmitted from the network via a connection to speaker buffers 30. Speaker buffers 30 operate as shown in U.S. Pat. No. 4,466,093 in FIG. 4 and in the accompanying description in the specification.

During a time slot of the switching system two of the three speaker conferee's PCM samples are output via multiplexers 31 and 32 to PROM 39. That is, 8-bits comprising the PCM sample of speaker A and 8-bits comprising the PCM sample of speaker B are output in one time slot to PROM 39. In another time slot the PCM samples of speakers B and C are output. During last time slot required for this operation, the PCM samples of speakers A and C are output. Each of the speaker's PCM samples is an 8-bit value. The seven least significant bits of this value comprise the magnitude of the speaker's voice sample. The high order or eighth bit is the sign of the voice or speech sample. Each of these 8-bit entities, of the twelve-bits output by the multiplexers 31 and 32, is input as an address to PROM 39.

Each of the 64K × 8-bit locations of PROM 39 has been preprogrammed with values. Each of the 8-bit values stored in PROM 39 represents an additive combination or sum of the magnitude of the two PCM samples input on the buses SPKA and SPKB.

The 8-bits of the SPKA and the SPKB buses, which contain either conferee A's, B's or C's PCM voice samples, are added to one another and the resultant output transmitted from PROM 39 to multiplexer 50 for output to the PCM switching network. By combining the two input samples, the listening conferee receives a true representation of the combination of sounds of the other conferees. In addition, much of the noise from rapid switching is avoided.

Since the PCM values, combined by PROM 39, are nonlinear logarithmic values, the combination is not a straightforward addition. Each 8-bit PCM sample may be represented in a linear form.

An eight segment linear representation of the compressed PCM is shown in FIG. 6. The sign bit is designated by S. The logic zeros and ones are as indicated and the X positions may take on either the value of logic zero or one. As can be seen from FIG. 6, each segment has the values of two times the one preceding it. That is, the possible values of segment 6 are twice as great as the values contained in segment 7. Once speech samples are in linear form, their combination is possible by addition. The translation from compressed PCM to linear and from linear to compressed PCM will be explained infra.

The values contained on the SPKA and SPKB buses form a 16-bit address, which when applied to PROM 39, cause PROM 39 to output the proper combined PCM value of the inputs on the SPKA and the SPKB buses. This arrangement provides for a single chip replacement of all the logic shown in FIG. 5 of U.S. Pat. No. 4,466,093. In addition, processing time of the circuitry is minimized from that shown in FIG. 5 of the U.S. Pat. No. 4,466,093 . The present improvement constitutes a single read operation from PROM 39. This saves system real time that may be utilized to provide other features or processing capability in the digital switching network. The value output by PROM 39 is a true combination of the conferees' speech. Due to this combination, no loudest speaker determination need be made and the corresponding logic may be deleted.

Next, referring to FIGS. 2 through 5, an off-line method of generating the contents of PROM 39 is shown. This method is initiated by entering the start block. Firs, an index for speaker A is set to zero, 100. Next, the PCM voice sample value is separated into two components, the sign bit and seven bits representing the magnitude of speaker A's PCM voice sample 101. Next, the seven magnitude bits of speaker A are converted from compressed PCM to a linear representation 102. Block 102 transfers control to convert compressed magnitude to linear, subroutine 120, shown in FIG. 4, to provide this function.

Next, the initial value of the speaker B index is set equal to zero, block 103. Then, the value of the speaker B PCM voice sample is separated into the sign of the speaker B sample and the seven bit magnitude of the speaker B sample, 104. Block 105 then calls convert compress to linear, subroutine 120, to convert the magnitude of the speaker B sample from compressed PCM to linear form.

Next, block 106 determines whether the sign of sample A is equal to the sign of sample B. If these signs are equal, block 107 is entered. Block 107 sets the sign of sample C, the output sample, equal to the sign of sample A. The value of sample C is the value output from the particular memory byte represented by the corresponding values of samples A and B. The linear value of sample C is then made equal to: the linear value of sample A, minus 16; plus to the linear value of sample B, minus 16; plus 16, block 107.

If the signs of samples A and B are not equal, then block 108 is entered. Block 108 determines whether the magnitude of sample A is greater than or equal to the magnitude of sample B. If the magnitude of sample A is greater than or equal to the magnitude of sample B, then block 109 is entered. Block 109 sets the sign of sample C equal to the sign of sample A. Block 109 also calculates the linear value of sample C to be: the linear value of sample A, minus 16; minus the linear value of B, minus 16; plus 16.

If the magnitude of sample A is not greater than or equal to the magnitude of sample B, block 110 is entered. Block 110 sets the sign of sample C equal to the sign of sample B. Next, block 110 sets the linear value of sample C equal to: the linear value of sample B, minus 16; minus the linear value of sample A, minus 16; plus 16.

After the processing of blocks 107, 109 and 110 are complete, control is transferred to block 111. Block 111 determines whether the linear value of sample C is greater than the maximum allowable value. If the value of sample C is greater than the maximum value, block 112 truncates the value or sets the linear value of sample C equal to the maximum value. Each value 16, mentioned above, is expressed in base ten or decimal.

Block 113 converts the linear value of sample C to the compressed magnitude of sample C by calling, subroutine 130, convert linear to magnitude. Then, the sign of sample C is combined with the magnitude of sample C, which is retrieved from the convert linear to magnitude, block 114. Next, the PCM value of sample C is output to the proper location of the PROM 39. Any threshold level determination, which is desired, may be checked at this time. The output location is the location indexed by the speaker A and B index values combined and used as a 16-bit address.

Next, the value of the speaker B index is incremented by 1, block 116. If the value of the speaker B index is greater than 255, the Y path from block 117 is followed and control is transferred to block 118; otherwise, the N path from block 117 is followed and control is transferred to block 104. Blocks 104 through 117 are iterated for another value of the A and B indices.

Block 118 increments the value of the speaker A index. Next, block 119 determines whether the value of the speaker A index is greater than 255. If the value of the speaker A index is less than or equal to 255, the Y path from block 119 is followed and control is transferred to block 101. The steps of blocks 101 through 119 are iterated for incremented values of the A and B indices. If the speaker B index is less than or equal to 255, the Y path is followed from block 119 and process is ended. The programming process of PROM 39 has been completed.

The convert compressed PCM magnitude to linear values subroutine or procedure 120 is depicted in FIG. 4. When called upon the subroutine is entered via block 120. Next, block 121 separates the magnitude value of the compressed PCM sample into a segment value and a step value. The segment value is the upper 3-bits of the magnitude and the step value is the lower 4-bits of the magnitude. The steps are the values of the X bits of each segment as shown in FIG. 6.

Next, the negative value of the step portion of the magnitude is calculated, block 122. Then, 16 decimal is added to this value, block 123. The resultant value is then shifted left the number of positions equal to seven decimal minus the segment value, block 124. Subroutine 120 returns control and the converted value to the calling block.

FIG. 5 depicts the subroutine for converting linear values to PCM magnitude values. For converting linear values to PCM magnitude block 130 is entered. The segment number is determined by examining the left most bit position containing a logic one bit, block 131. This may be accomplished by iterating left shift, count and test steps. Next, a step number is obtained from the next four bits following this first logic one bit position, block 132. The negative value of the step is obtained, block 133. The step and segment numbers are combined into the proper positions, as shown in FIG. 6, block 134. Then, this subroutine transfers control along with the value calculated to the calling block.

Figure 7:
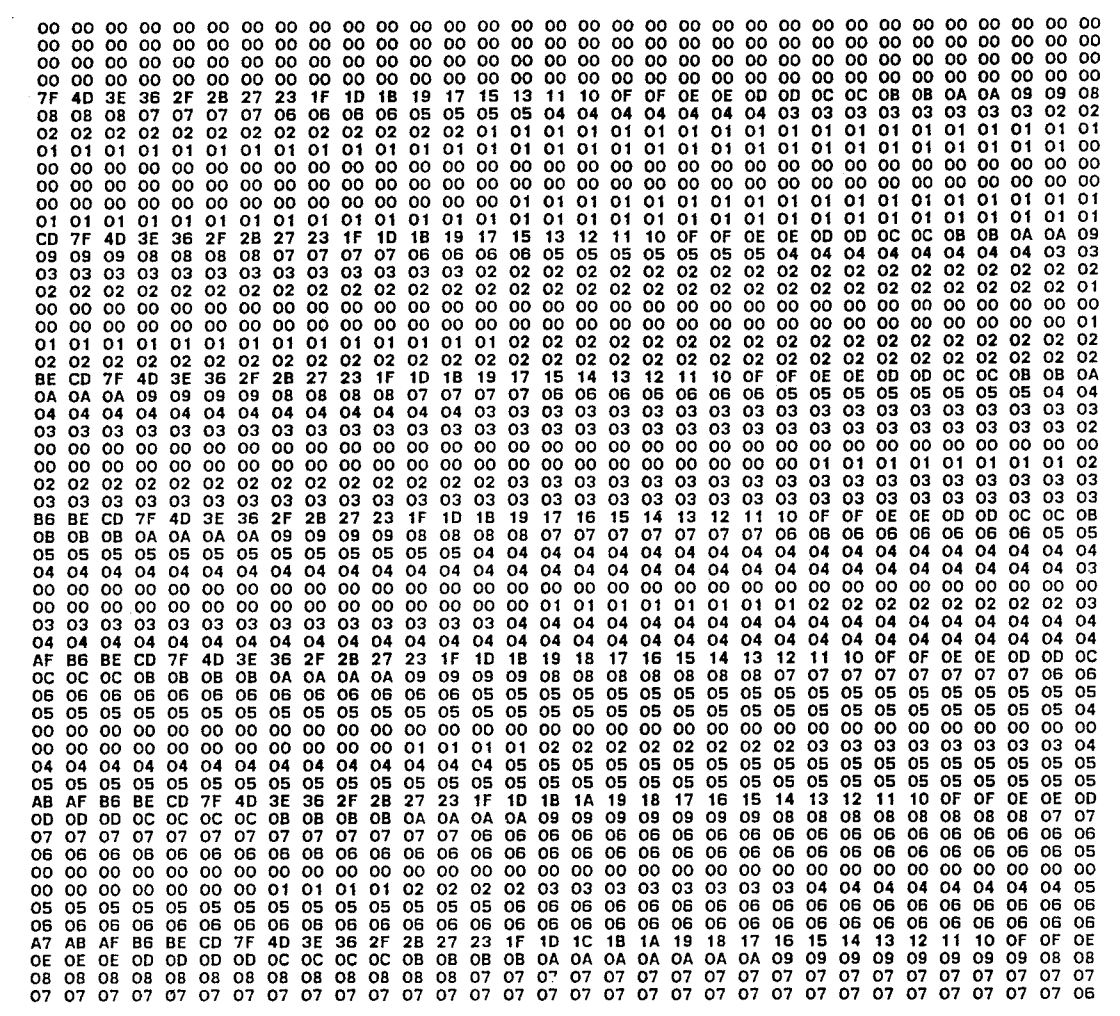

FIG. 7 depicts a portion of the contents of PROM 39. Location 0 is at the upper left of the figure. The figure is read from left to right and top to bottom. The last location shown is location 1,792 base 10 in the lower right hand portion of this figure. Each two digits represent the contents of an 8-bit location within PROM 39. All numbers shown in FIG. 7 are hexadecimal.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a Time-Space-Time switching system, in combination with a time shared conference arrangement which includes a plurality of switching system subscribers including a first, a second and a third subscriber, said switching system having a Time-Space-Time digital switching network connected to each said subscriber and said network being operated to connect said first, second and third subscribers in said conference arrangement by transferring PCM voice data samples of said subscribers in three consecutive time slots, timing means connected to said switching network and being operated to generate a plurality of periodic pulses, first buffering means connected to said timing means and to said switching network, said first buffering means being operated to sequentially store said voice data samples of said three consecutive switching network time slots, said three voice data samples being PCM samples of said first, said second and said third subscribers, respectively, said time shared conference arrangement operating serially during a successive time slot, second buffering means connected to said timing means and to said first buffering means, said second buffering means being operated to simultaneously store said three voice data samples of said first buffering means, said first buffering means being further operated to store said voice data sample of a next time slot of said switching network time slots, said voice data of said next time slot being a PCM sample of a first other subscriber in a second conference arrangement, first gating means connected to said second buffering means and to said timing means, said first gating means being operated to transmit two voice data samples of said stored three voice data samples, during each said successive time slot, and multiplexing means; the improvement comprising:

means for combining connected to said first gating means, said means for combining being responsive to values of said two voice data samples of said first gating means to produce a resultant voice data sample, said resultant voice data sample being an additive result of said values of said two voice data samples of said first gating means; and said multiplexing means connected to said means for combining, said multiplexing means operated during a next successive time slot to transmit said resultant voice data sample to said switching network.

2. The improvement according to claim 1, said means for combining including means for storing connected to said first gating means, said connection of said means for storing to said first gating means including a bus connection for connecting said two voice data samples in parallel to said means for storing, as an address.

3. The improvement according to claim 2, said means for storing including read only memory means.

4. The improvement according to claim 3, said read only memory means including programmable read only memory means being preprogrammed to contain a plurality of said resultant voice data sample values, each resultant voice data sample value being a PCM addition of the PCM values of a pair of voice data samples of said first gating means.

5. The improvement according to claim 4, said programmable read only memory means including a programmable read only memory device of approximately 64K×8-bits.

6. The improvement according to claim 5, said switching system including:
   a plurality of interface units, each said interface unit connected between at least one said subscriber and said switching network, each said interface unit being operated to generate and to transfer said PCM voice data samples of said connected subscribers between said switching network and said subscribers in particular time slots, and
   processor means connected to each of said interface units and to said switching network, said processor means being operated to control said transfer of said voice data samples to said interface units and to said switching network.

7. The improvement according to claim 6, wherein: said timing means is further operated to cyclically produce three clock signals, a first, a second and a third clock signal, in three consecutive time slots; and said first buffering means including:
   a first buffer connected to said timing means and being operated in response to said first clock signal to store a PCM voice data sample of a first time slot;
   a second buffer connected to said timing means and being operated in response to said second clock signal to store a PCM voice data sample of a second consecutive time slot; and
   a third buffer connected to said timing means and being operated in response to said third clock signal to store a PCM voice data sample of a third consecutive time slot.

8. The improvement according to claim 7, wherein each said buffer stores twelve binary digits; eight of said binary digits representing said subscriber's voice sample; three of said binary digits representing network supervision information; and one of said binary digits representing parity information over said voice and supervision information.

9. The improvement according to claim 8, wherein: said timing means is further operated to cyclically produce an input count signal during every third time slot; and said second buffering means including:
   fourth buffer connected to said first buffer and to said timing means;
   a fifth buffer connected to said second buffer and to said timing means;
   a sixth buffer connected to said third buffer and to lo said timing means; and
   said fourth, fifth and sixth buffer simultaneously operated in response to said input count signal to store said three PCM voice data samples.

10. The improvement according to claim 9, wherein each said buffer stores twelve binary digits; eight of said binary digits representing said subscriber's voice; three of said binary digits representing network supervision information; and one of said binary digits representing parity information over said voice and supervision information.

11. The improvement according to claim 10, said first gating means including:
    said timing means being further operated to cyclically produce a first and second output count signals during each time slot;
    a first multiplexer connected to said fourth and to said fifth buffers and to said timing means and said first multiplexer being operated in response to a first output count signal to transmit said voice data samples of said fourth buffer or alternatively to transmit said voice data samples of said fifth buffer; and
    a second multiplexer connected to said fifth and said sixth buffers and to said timing means and said second multiplexer being operated in response to a second output count signal to transmit said voice data samples of said fifth buffer or alternatively to transmit said voice data samples of said sixth.

12. The improvement according to claim 11, wherein:
    in a first time slot said first multiplexer is operated to transmit said voice sample of said fifth buffer and simultaneously said second multiplexer is operated to transmit said voice sample of said sixth buffer;
    in a second consecutive time slot said first multiplexer is operated to transmit said voice sample of said fourth buffer and simultaneously said second multiplexer is operated to transmit said voice sample of said sixth buffer; and
    in a third consecutive time slot said first multiplexer is operated to transmit said voice sample of said fourth buffer and simultaneously said second multiplexer is operated to transmit said voice sample of said fifth buffer.

* * * * *